United States Patent [19]

Mutter

[11] 4,030,380

[45] June 21, 1977

[54] SAFETY GEAR CHANGE APPARATUS FOR SNOW CLEARING VEHICLES

[75] Inventor: Werner Mutter, Todtmoos, Germany

[73] Assignee: Ing. Alfred Schmidt GmbH, Blasien, Black Forest, Germany

[22] Filed: Dec. 19, 1975

[21] Appl. No.: 642,500

[30] Foreign Application Priority Data

Dec. 24, 1974 Germany .......................... 2461421

[52] U.S. Cl. .............................. 74/866; 180/103 R
[51] Int. Cl.² ......................................... B60K 41/22
[58] Field of Search ...... 74/866; 180/103 R, 103 A

[56] References Cited

UNITED STATES PATENTS

| | | |
|---|---|---|
| 3,719,096 | 3/1973 | Sprague et al. ................... 74/866 X |
| 3,808,738 | 5/1974 | Siebers et al. ................... 74/866 X |
| 3,885,472 | 5/1975 | Wakamatsu et al. ................ 74/866 |

*Primary Examiner*—Leonard H. Gerin

[57] ABSTRACT

A safety gear transmission having a plurality of forward gears and a single reverse gear is provided with preselection control means for operation of the reverse gear by means of which the reverse gear is automatically actuated in response to a given stimulus for a sufficient time to assure that the vehicle, or at least the snow clearing unit moves free of the obstacle. The control means may operate either on sensing the presence of a dangerous obstacle itself, or on the changing directional state of the snow unit occurring as a result of the vehicle driving into such an obstacle, or in response to the manual operation of a manual control member.

12 Claims, 3 Drawing Figures

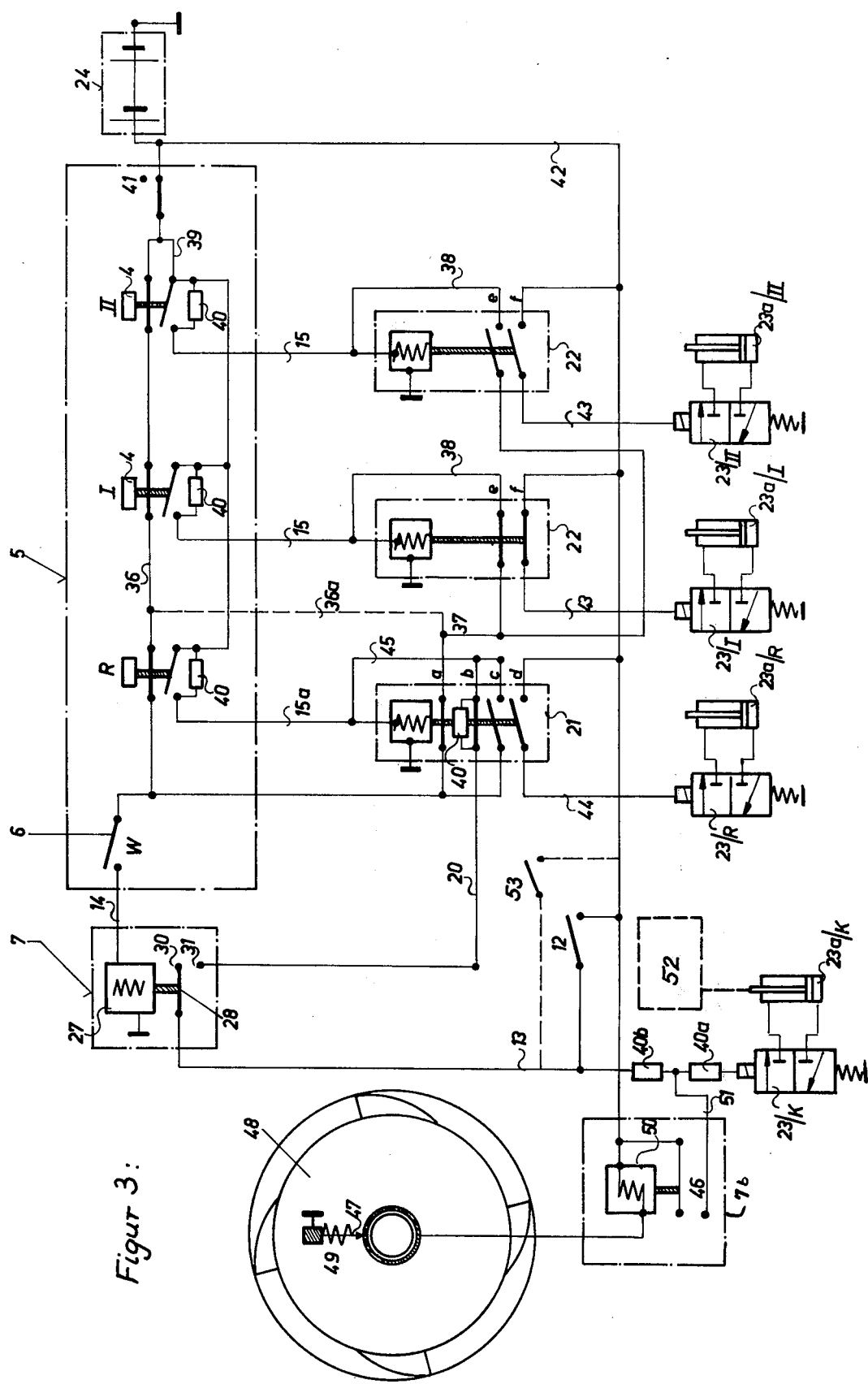
Figur 3:

SAFETY GEAR CHANGE APPARATUS FOR SNOW CLEARING VEHICLES

BACKGROUND OF THE INVENTION

This invention relates to safety gear transmissions for snow clearing vehicles, particularly blower type snow ploughs and rotary snow ploughs.

It is desirable that all vehicles equipped with snow clearing units should incorporate safety gear change transmissions, because of the fact that during use of such vehicles there is always a danger than the snow clearing unit will hit an obstacle that is covered by snow and therefore will not be visible to the driver of the vehicle. When blower type snow ploughs are used having a rotary blower unit fitted to the front of the vehicle, the expensive blades are frequently damaged by encountering solid obstacles. Up to the present time the extent of such damage has largely been limited by controlling the speed of the vehicle and the speed of the driver's reaction on striking such an obstacle. In conventional existing vehicles the drivers only recourse, upon first hearing or feeling that a collision with an obstacle had occurred, was to depress the clutch pedal of the vehicle placing the transmission in neutral, and thereafter applying the brakes, so that the continued advance of the vehicle ceased as quickly as possible. However, the interruption of the vehicle drive occurring on depression of the clutch pedal unfortunately does not cause the vehicle to stop instantaneously, even when moving quite slowly. Under snow conditions, the use of brakes is not of much help. Due to the inertia of the vehicle it still continues to move on with the result that uncontrollable damage can occur in the short time before the vehicle eventually stops.

The object of the present invention is to substantially reduce or avoid the damage which can occur to a vehicle of the type described on hitting an obstacle.

It is a particular object of the present invention to provide an automatic gear changing mechanism for a snow-clearing vehicle that automatically shifts the vehicle into reverse gear upon reaction to the sighting or to the striking of an obstacle in its path of travel.

These objects as well as others together with several advantages will be apparent from the following disclosure.

SUMMARY OF THE INVENTION

According to the present invention a safety gear transmission having a plurality of forward gears and a single reverse gear is provided with preselection control means for operation of the reverse gear by means of which the reverse gear is automatically actuated in response to a given stimulus for a sufficient time to assure that the vehicle, or at least the snow clearing unit moves free of the obstacle. The control means may operate either on sensing the presence of a dangerous obstacle itself, or on the changing directional state of the snow unit occurring as a result of the vehicle driving into such an obstacle, or in response to the manual operation of a manual control member.

The present invention is preferably carried out wherein the respective gears are controlled or operated by hydraulic and/or pneumatic switching devices in which the respective forward and reverse gears are operated by a fluid piston/cylinder actuated by a suitable electromagnetical controlled valve selectively actuated by a solenoid relay contactor itself actuable by control switches manually operable by the driver.

In a particular preferred embodiment the reverse gear is automatically engaged as a result of the operation of the vehicle clutch pedal, being an illustrative type of the control member referred to above. Briefly, the snow clearing vehicle is shifted automatically into reverse gear by providing a preselection circuit by which the depression of the clutch pedal by the driver of the vehicle upon the sighting or striking of an obstacle, closes a normally open switch which then completes the circuit to the relay contactor of the reverse gear, thereby actuating the reverse gear solenoid contactor and supplying current to the reverse gear electromagnetic control valve which in turn operates a fluid compression cylinder which engages and disengages the reverse gear. The preselection circuit is armed by a preselection control button mounted on the control panel in which the conventional control buttons for the normal operation of the gears of the vehicles are located. The automatic engagement of the reverse gear in the foregoing embodiment occurs substantially simultaneously with the operation of the clutch pedal so that the vehicle reverses its direction of movement equally rapidly without regard to the preceding condition of the transmission. Further engagement with the obstacle is thereby immediately avoided and the snow clearing element of the vehicle is removed from the danger zone substantially immediately. The only prior step which the vehicle driver needs to take in this connection is the actuation of the preselection control circuit and this an experienced driver will do according to the probable danger of obstacles in the area in which he is working. Thereafter, by solely operating the clutch pedal, damage caused by ramming an obstacle can to a large extent at least be avoided.

The control system can be provided with means for maintaining engagement of the reverse gear even upon the release of the clutch pedal. The contactor relay is provided with a circuit which maintains the reverse gear solenoid contactor actuated at least for a given time period, to insure separation of the vehicle from the obstacle.

In another embodiment of the invention, a sensing means is provided on the snow-clearing unit, itself which senses the obstacle, a change in direction of the plough means, the non-operation of the plough, as for example, by the non-existence of centrifugal force provided by the rotation of a rotary snow plough or blower. A solenoid relay is connected in series with the sensing means which in response thereto actuates the reversing gear solenoid relay thereby effecting reversal of the vehicle as in the preceding embodiment and supplies current to an electromagnetic control valve which operates an air compression cylinder to automatically depress the clutch pedal of the vehicle and thereby close a second switch operable by the depression of the clutch pedal. The closing of the second switch in a manner similar to the closing of the first switch causes the reverse gear of the vehicle to continue to be engaged and thereby drive the vehicle in the reverse direction away from the obstacle.

In still another embodiment, there is provided a means for disconnecting the drive to the snow-clearing plough unit itself upon the automatic change of gears from forward to reverse in response to the depression of the clutch pedal by the driver or by the automatic means for depressing the clutch in response to the means for sensing the non-rotation of the snow-clearing equipment.

Full details of the present invention are set forth in the following disclosure and are illustrated in the accompanying drawings.

BRIEF DESCRIPTION OF THE DRAWINGS

FIG. 3 is a circuit diagram of an electro-pneumatic control circuit for controlling the movement of the vehicle and operation of the gear change mechanism in accordance with the present invention.

DETAILED DESCRIPTION OF THE INVENTION

Figure 1:
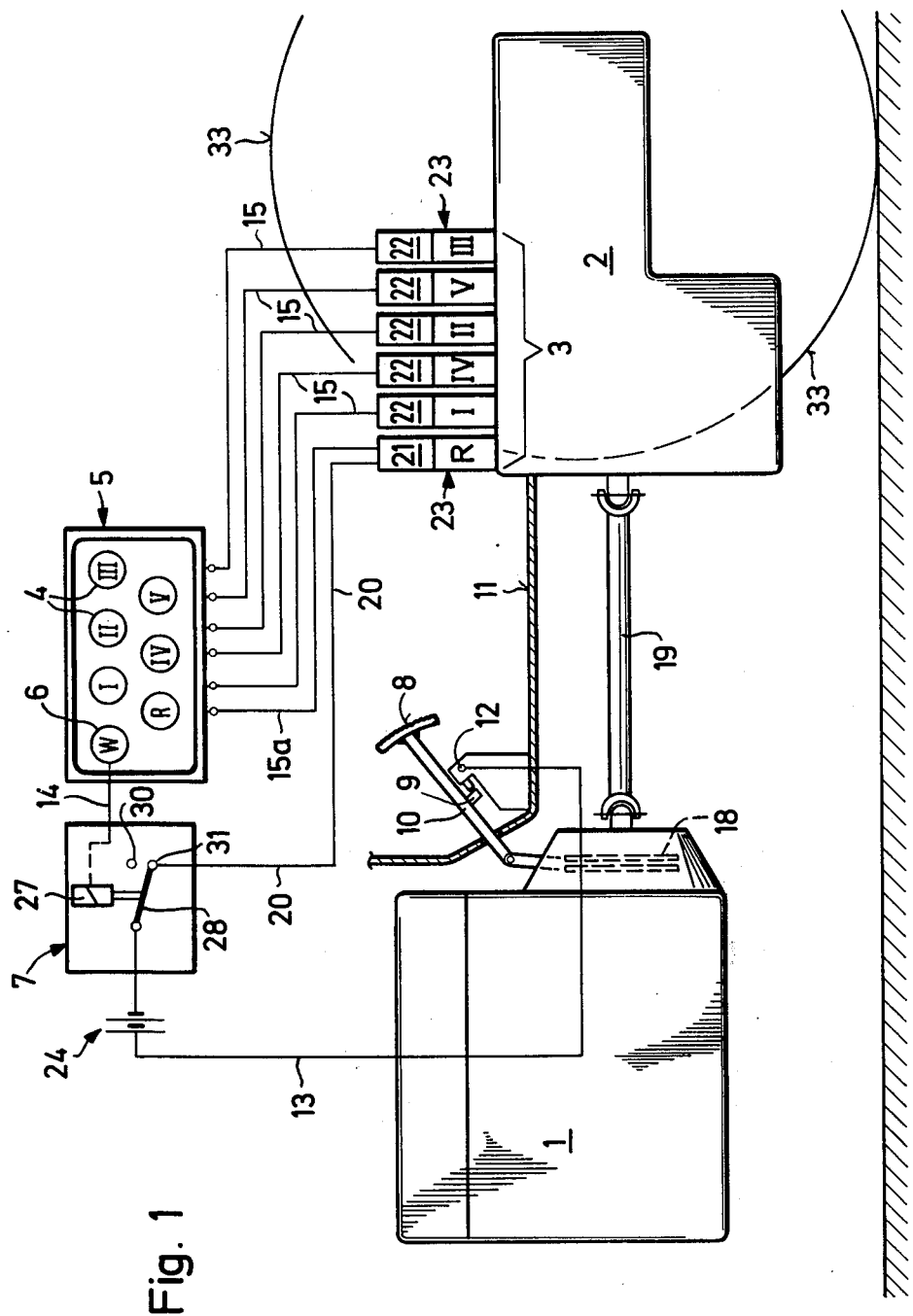
FIG. 1 is a schematic view of a snow clearing vehicle employing a transmission equipped with the safety gear change mechanism of the present invention.

Referring now to the drawings, and particularly to FIG. 1 a snow clearing vehicle is schematically shown having a front engine 1, a gear box 2 housing an otherwise conventional gear transmission for controlling the movement of the vehicle, a clutch 18 and drive shaft 19 connected to a set of rear wheels 33. The transmission includes a gear switching device 3 for the hydraulic/pneumatic operation of the vehicle gears which may be located within or adjacent to the gear box as desired. There are provided five forward gears I to V and associated switch means, each indicated generally by reference numeral 22, and one reverse gear R and its associated switch means indicated by reference numeral 21. The switch means 21 and 22 are solenoid relay contactors having an actuating winding, an armature and a plurality of contacts at least one of which as shown in FIG. 3 establish contact with electro-fluid valve means 23 to be described in more detail below. The five electro-fluid means 23, one for each forward and reverse gears, control the engagement and disengagement of their respective gears.

Electrically connected to the relay contactors 21 and 22 via lines 15a and 15, respectively, is a selection control panel 5 having five control buttons 4 corresponding to the five forward gears and the one button 45 R corresponding to the reverse gear. A sixth button 6 labelled "W" is also contained in the control panel 5 which as explained below, is connected to a preselection control circuit, for establishing the automatic shifting to reverse gear in respone to one of the obstacle stimuli, i.e., upon the depression of the clutch pedal or the non-rotation of the snow plow equipment.

The clutch pedal 8 is mounted on a spring loaded articulated stem 10 so that it can be manually depressed by the driver toward the floor panel 11. A normally open switch 12 (preferably a micro-switch) is mounted on the floor panel 11, adjacent the clutch pedal stem 10, on which a cam 9 is mounted. Depression of the stem 10 causes the cam 9 to engage the switch 12, closing the same and setting up a circuit, via line 13, to the electrical control circuit 7 designed to automatically activate the switching mechanism controlling the reverse gear.

The control circuit 7 consists of a simple switch arm 28 having two relay terminals 30 and 31. The switch arm 28 is operated by a solenoid 27 and which when in engagement with terminal 30 allows normal operation of reverse gear R but which, when in contact with terminal 31 provides for automatic operation of the reverse gear R. A power source 24 is provided for the switching circuit which is shown in the figure to be completed through terminal 31 and a line 20 to a contactor 21 for automatic operation of the reverse gear R. The switch W in the control panel 5 is connected to the winding 27 of the control citcuit 7 by a line 14 the winding being appropriately connected to the power source as well so that on closing of the switch W the arm 28 is placed in contact with the terminal 31. As a result of the operation of the switch 12 when the clutch pedal 8 is depressed a current impulse passes, with the switch 28 in engagement with terminal 31, to the relay contactor 21, which causes reverse gears to be engaged via the hydraulic/pneumatic mechanism 23.

Referring now to FIG. 3 there is shown in detail an electro-pneumatic control circuit by which the five forward and one reverse gears may be controlled under normal operation and through the preselection control circuit for automatically to activate the reverse gear switching system. For clarity only two forward gear switching systems and the reverse gear switching system have been shown, although it is to be understood that the other three forward gears are controlled in similar fashion. Also for illustration a pneumatic gear change system is shown, although the source of pressurized air and its delivery to the compression cylinder is omitted for brevity.

A source of power 24 such as the vehicle battery is connected in series with each of the control buttons 4 and the reverse button R via an on-off switch 41 and line 36. Each control botton 4 and the reverse button R are spring loaded and all have a normal rest contact which is connected in the line 36 as well as a pivotal working contact which is selectively connected to the source of power 24 leading via lines 15 for the forward gears and line 15a for the reverse gear via line 39. Lines 15 supply current to their associated forward gear relay contactors 22 and the electrical connector 15a supplies current to the reverse gear relay contactor 21 when the respective one of the control buttons is depressed. At the same time that the control button is depressed, the rest contact is moved out of electrical connection with the line 36.

Each relay contactor 21, 22 controls the supply of current to an electromagnetic control valve 23, the respective control valves for each gear being indicated by the numeral 23 followed by a slashed line and the gear indication to which it pertains. The electromagnetic control valves in turn control air compression cylinders 23a the pistons of which actuate the appropriate gears. In FIG. 3, the first gear is shown as being engaged although the associated valve 23I has returned to normal condition. The pneumatic gear change valves are conventional in structure and function.

In order to show how the control circuit operates, it will be assumed that now the control button 4 which pertains to the second gear II is depressed to thereby shift the vehicle into second gear. Upon the depression of the control button 4 for the second gear, current flowing from the power source through the line 36 and to the first gear switching means I and to the reverse gear switch W is cut-off by the movement of the rest contact of button 4II, and the line 39 supplies current to the line 15 of gear II via the working contact of button 4II. Current flowing through this line 15 will activate the relay contactor 22 belonging to the second gear and pivot its contacts so that contacts e and f are closed. At that time, current from the power source 24 is supplied to the electromagnetic valve 23/II via the line 42, contact *f* and the line 43, thereby activating the air compression cylinder 23*a*/II to cause engagement of the second gear.

Since the control buttons 4 are resiliently biased so that their normal position is such that the working contact is open, a secondary flow path is provided to sustain the supply of current to the electromagnetic control valve 23/II and the air compression cylinder 23*a*/II to keep the second gear engaged even after release of the button. This secondary holding flow path comprises the line 37 emanating from the now closed contact *e* and completes a path including the lines 38, 37, 36*a*, 36 and 41, thereby supplying current to the winding of the relay contactor 22. A timer 40 is provided across the working contact of each control button so that after the release of the control button the working contact will not open until the associate rest contact is closed and current is already flowing through the line 36 to insure that the relay contactor 22 is continuously activated and not opened during the switching of flow paths. It can, therefore, be seen that depressing the control button 4 pertaining to, for example, the second gear, will first shut off the supply of current through the line 36 to the previously activated gear system which therefore opens the relay contactor belonging to the previously engaged gear and simultaneously therewith will activate the relay contactor of the second gear to thereby engage the second gear. Further, after this initial setting up, the control button may be released, since there is automatically established a secondary holding flow path, for the continued supply of current to the second gear system, which is similarly susceptible to change by the depression of still another control button.

The solenoid relay contactor 21 of the reverse gear switching system differs somewhat from the relay contactors 22 of the forward gear switching systems. Relay contactor 21 in addition to having movable contacts *c* and *d* similar to the contacts *e* and *f* of the relay contacts 22 has two rest or usually closed contacts *a* and *b*. When reverse motion is desired, the driver depresses the control button 4 labelled "R" which thereby supplys current to the relay contactor 21 via the lines 39 and 15*a* similar to the operation of the forward gears. After the relay contactor 21 is in its closed position, current is supplied to the electromagnetic control valve 23/R via the lines 42, the contact *d* and the line 44 thereby actuating compression cylinder 23*a*/R connected to the reverse gear indicated by 52. However, the secondary flow path for continuing current flow to the switching means of the reverse gear is comprised of the lines 36 via the rest contacts of the control buttons 4, the movable or working contact *c* and the line 45. A timer 40 is also provided across the working contact of button R as in the switching system of the five forward gears.

In order to automatically cause the reversal of the motion of the vehicle upon the depression of the clutch pedal, the preselection button, or switch 6, labelled "W" is closed. The switch 6 is a latch type remaining closed once depressed and compeltes a current path from the source 24 via line 36 to the preselection control circuit 7. Thus the automatic means for reversal remains armed during operation of the vehicle. This arming is done when the driver of the vehicle feels that there is a great liklihood of encountering obstacles in his path of travel. The control circuit 7 has a solenoid switch 27 the winding of which is connected to line 36 via line 14 and to ground. The control unit 7 upon being actuated, pivots its working arm 28 from the rest contact indicated at 30 to a working contact indicated by 31. Contact 31 is thus placed in electrical connection with the rest contact *b* of the relay contactor 21 via a line 20 and in communication with the normally open clutch pedal control switch 12 via a line 13. Therefore upon the depression of the clutch pedal by the driver of the vehicle in response to the striking or sighting of an obstacle, the switch 12 is closed and current will be supplied to the winding of relay contactor 21 via the lines 42, the switch 12, line 13 contact 31, line 20, rest contact *b*, and the line 45. As a result current is then supplied to the electromagnetic control valve 23/R to thereby engage the reverse gear by supplying current via the line 42, the contact *d* and the line 44. The relay contactor 21 will hold itself in this closed position after the clutch has been disengaged by the supply of current through the secondary flow path formed by contact 41 and line 36, through the button R whose rest contact is closed, the movable contact *c*, and the line 45 thereby keeping the reverse gear engaged even after the clutch has been diesngaged. A timer 40 similar to the other timers mentioned is placed across the rest contact *b* of the relay contactor 21 so that in the switch-over of the circuit paths the rest contact *b* does not open before the secondary holding flow path takes effect. The other shift operations can occur in the usual manner described.

A varient of mechanical gear changing that is often used in vehicles of this type resides in providing means for reversing the vehicle without the need for first disengaging the forward gears. Instead the reverse movement may be started by the reversing gear 52 which is connected to the cylinders 23*a*/R. If this varient is employed with the present apparatus the rest contact *a* in the relay contactor 21 is not connected to the line 37. Line 37 is however connected via line 36*a* (dotted lines) to the current source via line 36. The compressed air cylinder 23*a*/R which is controlled via relay contactor 21 on depression of the button R, causes the shift of the reversing gear 52 even with forward gear engaged. For the re-engagement of the forward gear, the push-button contact R has only to be touched lightly without closing the working contact, so that the contactor 21 drops and the reversing gear 52 is changed via the compressed air cylinder 23*a*/R. Meanwhile, the forward gears remain "engaged" because the line 36*a* continues a complete circuit path, even though button R breaks the line 36.

FIG. 3 also shown an additional means for automatically reversing the vehicle (without even manual depression of the clutch) upon the striking of an obstacle which may be used alone or in combination with the above described automatic clutch operable reversing means. The additional means operates in response to the non-rotation of the rotary snow unit 48 which may occur by employing a shearing bolt drive or a unidirectional free wheel drive within the drive shaft for the unit 48 which upon striking an obstacle allows the unit to change its functional direction or become stationary without harm to its drive. The snow unit 48 has mounted therein a centrifugal switch 49 which during operation is normally in an open position away from the contact 47 by the force supplied by the rotation of the unit 48. The closing of the contact 47 of the switch 49 completes a circuit with the power source 24 through line 42 via secondary control circuit 7b. Upon the striking of an obstacle the rotary unit or drum 48 ceases its rotation thereby closing the contact 47 actuating the control circuit 7a in which the arm of its solenoid relay 50 drops closing contact 46 allowing current to flow to the reverse gear solenoid switch contactor 21 via the lines 42, 51, 13, 20, the contact b, and the line 45, thus acting to reverse the gear 52 as previously indicated.

This engagement of the reverse gear 52, however, is sustained as long as the drum 48 is not rotated so that additional means are provided which must automatically hold the contactor 21 in its closed position and therefore continue the reverse direction of the vehicle even after the snow unit 48 breaks contact with the obstacle. To this end an electromagnetic control valve 23/K is connected to line 13 which on closing of switch 46 actuates an air compression cylinder 23a/K connected mechanically to the clutch pedal so that upon the initial actuation of the reverse gear 52 by the contactor 21, in response the non-rotation of the drum 48, the clutch pedal will be depressed by the air compression cylinder 23a/K and thereby close another pedal control switch 53 mounted on the clutch stem 10. The switch 53 makes contact between the line 42 and line 13 and insures the actuation of the contactor 21 by the supply of current from the power source via the line 42, the switch 53, the line 13, the contact 31, the line 20, the rest contact b, and the line 45. A timer 40b is positioned between the lines 51 and 13 to delay the response of the opening of the contact 46. A timer 40a is positioned between the line 51 and the electromagnetic valve 23/K which opens the contact 46 after the reverse gear has been engaged and thereby re-engages the clutch and then closes the contact again, thereby making the circuit ready for operation again.

It will be appreciated that a pressure sensor, transducer or similar sensing device can be employed, instead of the centrifugal switch 49 to determine change in the operation of the snow unit. A photo sensor may also be employed to "sight" an obstacle even before the vehicle hits it.

Figure 2:
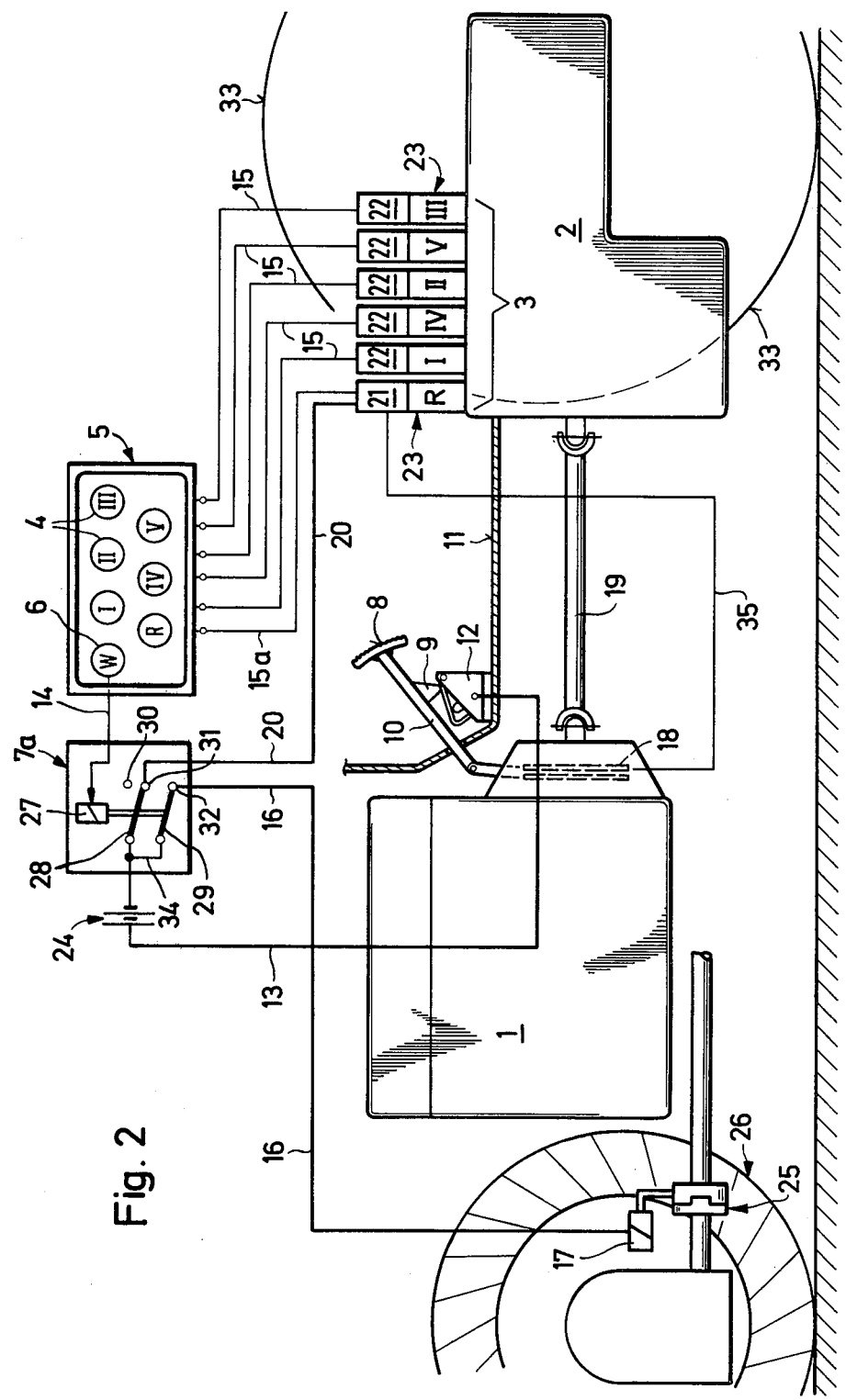
FIG. 2 is a view similar to FIG. 1 employing a safety gear change mechanism having an additional cut-off means disconnecting the drive to the snow-clearing plough unit.

In FIG. 2 there is shown a slight modification of the vehicle of the invention. In addition to the automatic gear change means shown in FIG. 3, the vehicle of FIG. 2 has a preselection switch 7a in which a second contact arm 29 is provided to make contact with a terminal 32 to complete a circuit path via line 34 to the power source. Terminal 32 is connected via a line 16 and a solenoid switch contactor 17 to a clutch 25 interposed in the drive shaft of the snow clearing unit (e.g. rotary plow) 26. Therefore, whenever the relay contactor 21 of the reverse gear switching mechanism is actuated, the contactor 17 is also actuated to simultaneously disengage the drive to the clearing element.

While specific embodiments of the invention have been disclosed and described, it is to be understood that numerous changes and modifications may be made without departing from the scope and spirit of the invention as contained in the claims.

What is claimed is:

1. In transmission apparatus for use in snow clearing vehicles having a plurality of forward gears, a reverse gear and a control circuit for selectively engaging one of said plurality of forward gears or said one reverse gear, a safety gear change mechanism for avoiding damage thereto by an obstacle in the path of travel of the vehicle, comprising a preselection control circuit electrically connected to the control circuit of said vehicle for automatically placing said control circuit in a state that shifts the vehicle into said reverse gear, in response to a given stimulus for a time sufficient to assure clearance of the vehicle from the obstacle.

2. The safety gear change mechanism according to claim 1 wherein said preselection control circuit comprises a selectively operable switch electrically connected to said control circuit, a relay connected in series with said control switch movable from a first contact to a second contact upon the closing of said preselection control switch to close a connection with that portion of said control circuit controlling the engagement and disengagement of the reverse gear, placing said control circuit in a state preparatory to shift the vehicle into said reverse gear, and switch means, electrically connected between said relay and said portion of said control means controlling the engagement and disengagement of the reverse gear, whereby upon the closing of said switch means said reverse gear is automatically engaged to drive the vehicle in a reverse direction.

3. The safety gear change mechanism according to claim 2 wherein said switch means comprises a first normally open switch mounted near the stem of a clutch pedal of the snow-clearing vehicle and closed by the depression of said clutch pedal to thereby engage the reverse gear.

4. The safety gear change mechanism according to claim 2 wherein said switch means comprises switch means for sensing the non-rotation of the snow-clearing equipment which is closed upon said non-rotation of the snow-clearing equipment means for automatically depressing the clutch pedal of the snow-clearing vehicle upon the closing of said switch means sensing the non-rotation of the snow-clearing equipment, and a normally open switch mounted near the stem of the clutch pedal of the snow-clearing vehicle which is closed upon the automatic depression of the clutch pedal by said means for automatically depressing the clutch pedal.

5. The safety gear change mechanism according to claim 2, wherein said means for automatically depressing the clutch pedal comprises a solenoid relay, an electromagnetic control valve electrically connected in series with said solenoid relay, and an air compression cylinder controlled by said electromagnetic control valve, whereby when said switch means sensing the non-rotation of the snow-clearing equipment is closed said solenoid switch completes a circuit with said electromagnetic control valve to thereby operate said air compression cylinder to depress the clutch pedal.

6. The safety gear change mechanism according to claim 2, further comprising means for disengaging the drive to the snow-clearing equipment of the vehicle upon the closing of said switch means, said means for disengaging the drive comprising a solenoid operatively connected to the clutch of the drive to the snow-clearing equipment, and said relay connected in series with said preselection control switch, whereby when said reverse gear is automatically engaged said drive of the snow-clearing equipment is simultaneously disengaged.

7. The safety gear change mechanism according to claim 5 wherein said switch means further comprises a first timer electrically connected between said electromagnetic control valve and said solenoid relay, and a second timer electrically connected between said solenoid relay and said relay connected in series with said preselection control switch, whereby said first timer delays the opening of said switch means sensing the non-rotation of the snow-clearing equipment until said clutch pedal is automatically depressed, and said second timer delays the opening of said switch means sensing the non-rotation of the snow-clearing equipment until said reverse gear is engaged and closes the connection between said solenoid relay and said electromagnetic relay after the reverse gear has been engaged.

8. A safety gear change mechanism for use in snow clearing vehicles which have a plurality of forward gears and one reverse gear and a control circuit for engaging one of said plurality of forward gears or said one reverse gear, said safety gear change mechanism automatically shifting the vehicle into reverse gear in order to avoid damage to the snow-clearing equipment mounted on the front of the vehicle by an obstacle in the path of travel of the vehicle, said control circuit comprising a control button for each of said plurality of forward gears and said one reverse gear, a power source connected in series with each of said control buttons, a plurality of solenoid contactors, one contactor for each of said gears connected in series with a respective one of said control buttons, each of said solenoid contactors having a pair of movable working contacts, a plurality of electromagnetic control valves, one control valve connected in series with a respective one of said solenoid contactors, and a plurality of air compression cylinders connected to and controlled by said electromagnetic control valves, one air compression cylinder and one electromagnetic control valve corresponding to each of said gears, whereby the improvement comprises a pair of rest contacts for said solenoid contactor corresponding to said reverse gear, a preselection control switch electrically connected to one of said working contacts and one of said rest contacts of said solenoid contactors of said reverse gear, a relay connected in series with said preselection control switch movable from a first contact to a second contact upon the closing of said preselection control switch to close a connection with the other of said rest contacts of said solenoid contactor of said reverse gear, and switch means operable in response to the presence of an obstacle electrically connected between said relay and said power source, whereby upon the closing of said switch means said reverse gear is automatically engaged to drive the vehicle in a reverse direction.

9. The safety gear change mechanism according to claim 8, wherein said switch means comprises a first normally open switch mounted near the stem of a clutch pedal of the snow-clearing vehicle and closed by the depression of said clutch pedal to thereby engage the reverse gear.

10. The safety gear change mechanism according to claim 8 wherein said switch means further comprises switch means for sensing the non-rotation of the snow-clearing equipment which is closed upon said non-rotation, means for automatically depressing the clutch pedal of the vehicle upon the closing of said switch means sensing the non-rotation of the snow-clearing equipment, and a second normally open switch mounted near the stem of the clutch pedal of the snow-clearing vehicle which is closed upon the automatic depression of the clutch pedal by said means for automatically depressing the clutch pedal.

11. The safety gear change mechanism according to claim 8, wherein said one rest contact is electrically connected with said control buttons and said power source, and said other rest contact is electrically connected to the coils of said solenoid contactor.

12. The safety gear change mechanism according to claim 11, wherein said solenoid contactor of said reverse gear further comprises a timer for said other rest contact for delaying the opening of said other rest contact, until said control circuit holds the reverse gear.

* * * * *